United States Patent
Daeschle et al.

(10) Patent No.: US 9,141,917 B2
(45) Date of Patent: Sep. 22, 2015

(54) COMPUTING SYSTEM OPERATING ENVIRONMENTS

(71) Applicants: Clemens Daeschle, Neckarsteinach (DE); Alexander Gebhart, Ubstadt-Weiher (DE)

(72) Inventors: Clemens Daeschle, Neckarsteinach (DE); Alexander Gebhart, Ubstadt-Weiher (DE)

(73) Assignee: SAP SE, Walldorf (DE)

( * ) Notice: Subject to any disclaimer, the term of this patent is extended or adjusted under 35 U.S.C. 154(b) by 376 days.

(21) Appl. No.: 13/720,345

(22) Filed: Dec. 19, 2012

(65) Prior Publication Data

US 2014/0173607 A1 Jun. 19, 2014

(51) Int. Cl.
- G06F 3/00 (2006.01)
- G06F 9/44 (2006.01)
- G06F 9/46 (2006.01)
- G06F 13/00 (2006.01)
- G06Q 10/04 (2012.01)

(52) U.S. Cl.
CPC ..................................... *G06Q 10/04* (2013.01)

(58) Field of Classification Search
None
See application file for complete search history.

(56) References Cited

U.S. PATENT DOCUMENTS

| | | | |
|---|---|---|---|
| 7,124,062 B2 | 10/2006 | Gebhart et al. | |
| 7,440,996 B2 | 10/2008 | Gebhart | |
| 7,464,376 B2 | 12/2008 | Bozak et al. | |
| 7,516,200 B2 | 4/2009 | Bozak et al. | |
| 7,546,553 B2 | 6/2009 | Bozak et al. | |
| 7,551,622 B2 | 6/2009 | Bozak et al. | |
| 7,565,383 B2 | 7/2009 | Gebhart et al. | |
| 7,568,199 B2 | 7/2009 | Bozak et al. | |
| 7,574,707 B2 | 8/2009 | Bozak et al. | |
| 7,587,480 B2 | 9/2009 | Gebhart et al. | |
| 7,594,015 B2 | 9/2009 | Bozak et al. | |
| 7,603,404 B2 | 10/2009 | Gebhart et al. | |
| 7,606,802 B2 | 10/2009 | Gebhart et al. | |
| 7,627,655 B2 | 12/2009 | Bozak et al. | |
| 7,631,069 B2 | 12/2009 | Bozak et al. | |
| 7,644,137 B2 | 1/2010 | Bozak et al. | |
| 7,653,902 B2 | 1/2010 | Bozak et al. | |
| 7,661,030 B2 | 2/2010 | Bozak et al. | |
| 7,673,054 B2 | 3/2010 | Bozak et al. | |
| 7,676,474 B2 | 3/2010 | Gebhart et al. | |
| 7,703,029 B2 | 4/2010 | Bozak et al. | |

(Continued)

OTHER PUBLICATIONS

Alex Allain, Sorting Algorithm Comparison, Feb. 7, 2005, cprogramming.com.*

*Primary Examiner* — Craig Dorais
(74) *Attorney, Agent, or Firm* — Fish & Richardson P.C.

(57) ABSTRACT

Techniques for optimizing an operation environment include receiving, from a first computing system, an optimization task at a second computing system; processing the optimization task in an initial optimization environment to obtain one or more initial optimization results; for each of the one or more initial optimization results, generating an optimization data record that comprises the optimization task, the initial optimization environment, and the initial optimization result; for each of the optimization data records: varying one or more parameters of the initial optimization environment to generate an updated optimization environment; processing the optimization task in the updated optimization environment to obtain an updated optimization result; storing the initial optimization results and updated optimization results in a repository that is part of or communicably coupled to the second computing system; and sorting the stored optimization results to determine one or more best optimization results of the stored optimization results.

17 Claims, 3 Drawing Sheets

(56) References Cited

U.S. PATENT DOCUMENTS

| | | |
|---|---|---|
| 7,739,686 B2 | 6/2010 | Gebhart et al. |
| 7,769,864 B2 | 8/2010 | Gebhart et al. |
| 7,779,063 B2 | 8/2010 | Gebhart et al. |
| 7,779,410 B2 | 8/2010 | Gebhart et al. |
| 7,793,290 B2 | 9/2010 | Gebhart et al. |
| 7,810,090 B2 | 10/2010 | Gebhart |
| 7,882,210 B2 | 2/2011 | Bozak et al. |
| 7,930,338 B2 | 4/2011 | Gebhart et al. |
| 8,069,362 B2 | 11/2011 | Gebhart et al. |
| 8,135,841 B2 | 3/2012 | Bozak et al. |
| 8,156,211 B2 | 4/2012 | Gebhart et al. |
| 8,458,693 B2 | 6/2013 | Gebhart et al. |
| 8,479,209 B2 | 7/2013 | Gebhart et al. |
| 8,627,326 B2 | 1/2014 | Gebhart |
| 8,635,308 B2 | 1/2014 | Gebhart et al. |
| 8,683,459 B2 | 3/2014 | Gebhart et al. |
| 8,713,556 B2 | 4/2014 | Bozak et al. |
| 8,762,986 B2 | 6/2014 | Gebhart et al. |
| 8,826,060 B2 | 9/2014 | Bozak et al. |
| 8,887,158 B2 | 11/2014 | Gebhart et al. |
| 8,930,851 B2 | 1/2015 | Gebhart et al. |
| 8,935,371 B2 | 1/2015 | Gebhart et al. |
| 2004/0221184 A1* | 11/2004 | Hellerstein et al. ........... 713/300 |
| 2014/0358604 A1 | 12/2014 | Gebhart et al. |
| 2015/0121058 A1 | 4/2015 | Gebhart et al. |

* cited by examiner

COMPUTING SYSTEM OPERATING ENVIRONMENTS

TECHNICAL BACKGROUND

This disclosure relates to operating environments of computing systems and, more particularly, improving the operating environments of the computing systems.

BACKGROUND

Optimization is important to any business software application. Currently, each business software customer implements a dedicated on-premise installation of an optimization engine. In some examples, the customer needs the optimization results on a daily basis. The customer runs the optimization engine at night (e.g., during off-work hours) to obtain the optimization results in the morning. However, in the morning, the optimization process has to be stopped during the execution of the optimization process because the results are needed, thus providing incomplete optimization results.

SUMMARY

The present disclosure relates to computer-implemented methods, software, and systems for optimizing an operating environment. In some implementations, a second computing system receives from a first computing system, an optimization task. The optimization task is processed in an initial optimization environment to obtain one or more initial optimization result. For each of the one or more initial optimization results, an optimization data record is generated that comprises the optimization task, the initial optimization environment, and the initial optimization result. For each of the optimization data record, one or more parameters of the initial optimization environment are varied to generate an updated optimization environment and the optimization task is processed in the updated optimization environment to obtain an updated optimization result. The initial optimization results and updated optimization results are stored in a repository that is part of or communicably coupled to the second computing system. The stored optimization results are sorted to determine one or more best optimization results of the stored optimization results.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations further includes, for each of the one or more updated optimization results, generating an additional data record that includes the optimization task, the updated optimization environment, and the updated optimization result.

A second aspect combinable with any of the previous aspects further includes storing the additional optimization data records in a repository that is a part of or communicably coupled to the second computing system.

A third aspect combinable with any of the previous aspects includes receiving, from the first computing system, an additional optimization task at the second computing system, the additional optimization task being substantially the same as the optimization task.

A fourth aspect combinable with any of the previous aspects further includes in response to receiving the additional optimization task, preparing the one or more best optimization results for display based on the stored updated optimization data records.

In a fifth aspect combinable with any of the previous aspects, the initial optimization environment is associated with the first computing system.

In a sixth aspect combinable with any of the previous aspects, processing the optimization task includes processing the optimization task by the second computing system that is remote from the first computing system.

A seventh aspect combinable with any of the previous aspects further includes determining a computational cost associated with each updated optimization environment.

In an eighth aspect combinable with any of the previous aspects, sorting the stored optimization results further includes utilizing a simple number comparison, a vector comparison, or utilizing a pattern recognition framework.

In a ninth aspect combinable with any of the previous aspects further, the first computing system includes an on-premise computing system and the second computing system includes an on-demand computing system.

A tenth aspect combinable with any of the previous aspects further includes preparing, based on one or more boundary conditions, the one or more best optimization results for display to a user through the first computing system.

Various implementations of a computing system according to the present disclosure may have one or more of the following features. For example, enterprise users may realize significant improvement in optimization quality and optimization results, as well as more expeditious optimization results. For example, the optimization process may be allowed to complete (or run significantly toward a completion) rather than be stopped during the process. As another example, an enterprise user (or other user) may receive a quantitative savings result from the optimization process as well as a qualitative description of an ideal technical setup. As another example, an enterprise user may be able to benefit from an optimization knowledge database that relies on other users' optimization results to, for example, increase a quality of the database as well as decrease time and costs of obtaining optimization results.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
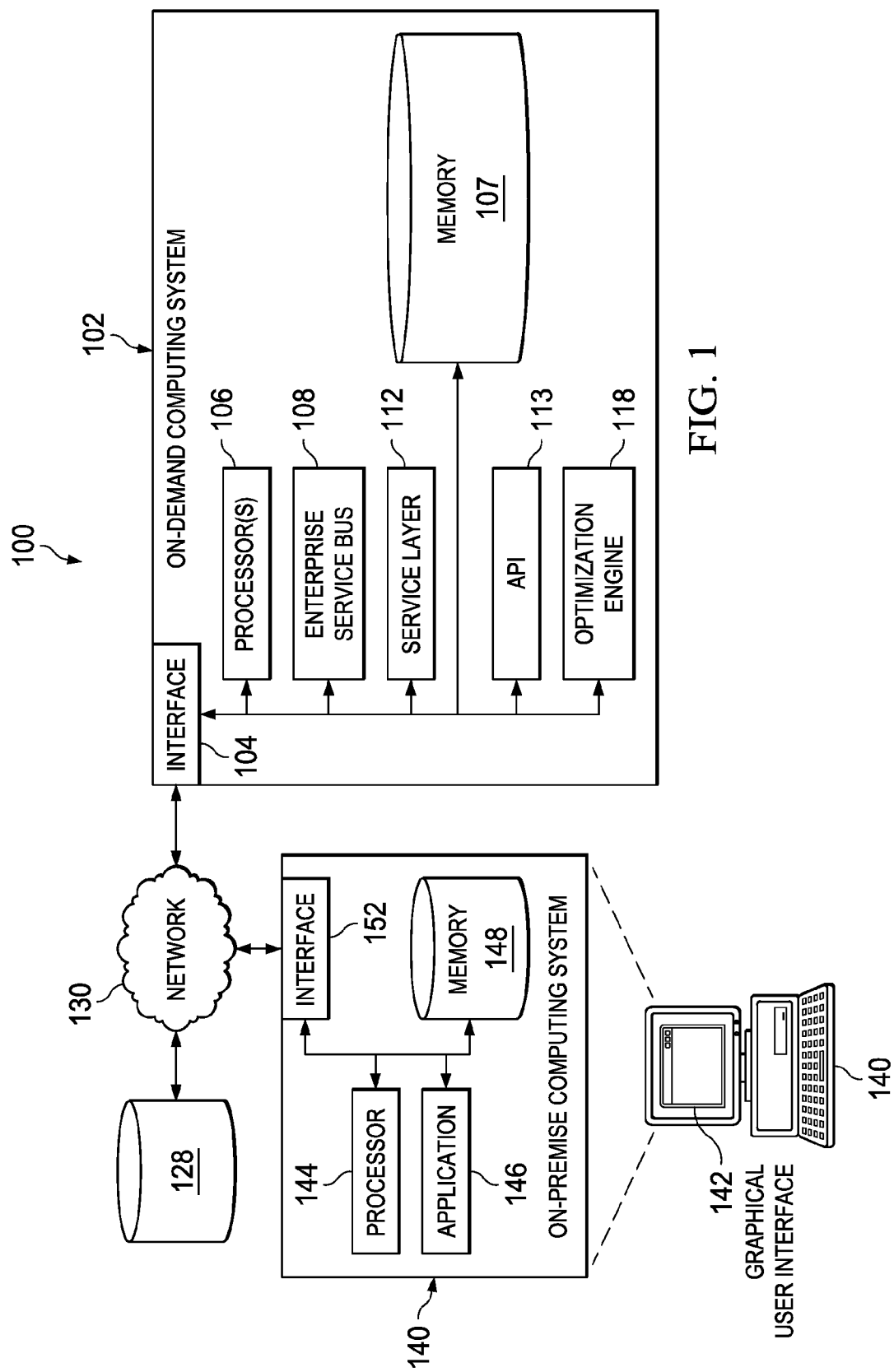
FIG. 1 illustrates an example distributed computing system for optimizing an operating environment of a computing system (e.g., an on-premise computing system)

FIG. 1 illustrates an example distributed computing system 100. For example, the illustrated distributed computing system 100 includes or is communicably coupled with an on-demand computing system 102, an on-premise computing system 140, and a repository 128, at least some of which communicate across a network 130. In general, the on-demand computing system 102 is any server that stores one or more hosted applications, such as for example, an optimization engine 118, where at least a portion of the hosted applications are executed via requests and responses sent to users or clients within and communicably coupled to the illustrated distributed computing system 100 of FIG. 1. In some aspects, computing system 100 optimizes an operating environment.

In some implementations, an optimization task is received at an on-demand computing system from an on-premise computing system. The optimization task is processed in an initial optimization environment to obtain one or more initial optimization results. For each of the one or more initial optimization results, an optimization data record is generated. In some examples, the optimization data record may include the optimization task, the initial optimization environment, and the initial optimization result. For each of the optimization data records, one or more parameters of the initial optimization environment is varied to generate an updated optimization environment and the optimization task is processed in the updated optimization environment to obtain an updated optimization result. The initial optimization results and updated optimization results may be stored in a repository that is part of or communicably coupled to the on-demand computing system. The stored optimization results may be sorted to determine one or more best optimization results of the stored optimization results. The one or more best optimization results may be prepared for display to a user through the on-premise computing system.

In some examples, the on-demand computing system 102 may store a plurality of various hosted applications, while in some examples, the on-demand computing system 102 may be a dedicated server meant to store and execute only a single hosted application. In some instances, the on-demand computing system 102 may comprise a web server, where the hosted applications represent one or more web-based applications accessed and executed via the network 130 by the on-premise computing system 140 to perform the programmed tasks or operations of the hosted application.

At a high level, the on-demand computing system 102 comprises an electronic computing device operable to receive, transmit, process, store, or manage data and information associated with the distributed computing system 100. Specifically, the on-demand computing system 102 illustrated in FIG. 1 is responsible for receiving application requests from one or more client applications associated with the on-premise computing system 140 of the distributed computing system 100 and responding to the received requests by processing said requests in the associated hosted application, and sending the appropriate response from the hosted application back to the requesting client application. In addition to requests from the on-premise computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single on-demand computing system 102, the distributed computing system 100 can be implemented using two or more servers, as well as computers other than servers, including a server pool. In some examples, the on-demand computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the on-demand computing system 102 may be adapted to execute any operating system, including Linux, UNIX, Windows, Mac OS, or any other suitable operating system.

As mentioned above, the on-demand computing system 102 includes an optimization engine 118. The optimization engine 118 receives optimization tasks from the on-premise computing system 140 and determines best optimization results for the optimization tasks. Specifically, the on-demand computing system 102 processes the optimization tasks in an initial optimization environment to obtain initial optimization results. For each of the initial optimization results, an optimization data record is generated that includes the optimization task, the initial optimization environment and the initial optimization result. For each of the optimization data records, one or more parameters of the initial optimization environment are varied to generate an updated optimization environment and the optimization task is processed in the updated optimization environment to obtain an updated optimization result. The initial optimization results and the updated optimization results are sorted to determine the best optimization results for the optimization task, and the best optimization results are prepared for display to a user of the on-premise computing system 140.

The on-demand computing system 102 further includes an interface 104. Although illustrated as a single interface 104 in FIG. 1, two or more interfaces 104 may be used according to particular needs, desires, or particular implementations of the example distributed computing system 100. The interface 104 is used by the on-demand computing system 102 for communicating with other systems in a distributed environment—including within the example distributed computing system 100—connected to the network 130; for example, the on-premise computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The on-demand computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the on-demand computing system 102. Specifically, the processor 106 executes the functionality required to receive and respond to requests from the on-premise computing system 140.

The on-demand computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the on-demand computing system 102, in some implementations, the memory 107 can be external to the on-demand computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The on-demand computing system 102 further includes a service layer 112. The service layer 112 provides software services to the example distributed computing system 100. The functionality of the on-demand computing system 102 may be accessible for all service consumers using this service layer. For example, in one implementation, the on-premise computing system 140 can utilize the service layer 112 to communicate with the optimization engine 118. Software services provide reusable, defined business functionalities through a defined interface. For example, the interface may be software written in extensible markup language (XML) or other suitable language. While illustrated as an integrated component of the on-demand computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The on-demand computing system 102 further includes an application programming interface (API) 113. In some implementations, the API 113 can be used to interface between the optimization engine 118 and one or more components of the on-demand computing system 102 or other components of the example distributed computing system 100, both hardware and software. For example, in some implementations, the optimization engine 118 can utilize the API 113 to communicate with the on-premise computing system 140. The API 113 may include specifications for routines, data structures, and object classes. The API 113 may be either computer language independent or dependent and refer to a complete interface, a single function, or even a set of APIs. While illustrated as an integrated component of the on-demand computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The on-premise computing system 140 may be any computing device operable to connect to or communicate with at least the on-demand computing system 102 using the network 130. In general, the on-premise computing system 140 comprises a computer operable to receive, transmit, process, and store any appropriate data associated with the example distributed computing system 100. The illustrated on-premise computing system 140 further includes an on-premise application 146. The on-premise application 146 is any type of application that allows the on-premise computing system 140 to request and view content on the on-premise computing system 140. In some implementations, the on-premise application 146 can be and/or include a web browser. In some implementations, the on-premise application 146 can use parameters, metadata, and other information received at launch to access a particular set of data from the on-demand computing system 102. Once a particular on-premise application 146 is launched, a user may interactively process a task, event, or other information associated with the on-demand computing system 102. Further, although illustrated as a single on-premise application 146, the on-premise application 146 may be implemented as multiple applications in the on-premise computing system 140.

The illustrated on-premise computing system 140 further includes an interface 152, a processor 144, and a memory 148. The interface 152 is used by the on-premise computing system 140 for communicating with other systems in a distributed environment—including within the example distributed computing system 100—connected to the network 130; for example, the on-demand computing system 102 as well as other systems communicably coupled to the network 130 (not illustrated). The interface 152 may also be consistent with the above-described interface 104 of the on-demand computing system 102 or other interfaces within the example distributed computing system 100. The processor 144 may be consistent with the above-described processor 106 of the on-demand computing system 102 or other processors within the example distributed computing system 100. Specifically, the processor 144 executes instructions and manipulates data to perform the operations of the on-premise computing system 140, including the functionality required to send requests to the on-demand computing system 102 and to receive and process responses from the on-demand computing system 102. The memory 148 may be consistent with the above-described memory 107 of the on-demand computing system 102 or other memories within the example distributed computing system 100 but storing objects and/or data associated with the purposes of the on-premise computing system 140.

Further, the illustrated on-premise computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the on-demand computing system 102. Generally, through the GUI 142, an on-demand computing system 102 user is provided with an efficient and user-friendly presentation of data provided by or communicated within the example distributed computing system 100.

There may be any number of on-premise computing systems 140 associated with, or external to, the example distributed computing system 100. For example, while the illustrated example distributed computing system 100 includes one on-premise computing system 140 communicably coupled to the on-demand computing system 102 using network 130, alternative implementations of the example distributed computing system 100 may include any number of on-premise computing systems 140 suitable to the purposes of the example distributed computing system 100. Additionally, there may also be one or more on-premise computing systems 140 external to the illustrated portion of the example distributed computing system 100 that are capable of interacting with the example distributed computing system 100 using the network 130. Moreover, while the on-premise computing system 140 is described in terms of being used by a single user, this disclosure contemplates that many users may use one computer, or that one user may use multiple computers.

The illustrated on-premise computing system 140 is intended to encompass any computing device such as a desktop computer, laptop/notebook computer, wireless data port, smart phone, personal data assistant (PDA), tablet computing device, one or more processors within these devices, or any other suitable processing device. For example, the on-premise computing system 140 may comprise a computer that includes an input device, such as a keypad, touch screen, or other device that can accept user information, and an output device that conveys information associated with the operation of the on-demand computing system 102 or the on-premise computing system 140 itself, including digital data, visual information, or a GUI 142, as shown with respect to the on-premise computing system 140.

The distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the network 130 facilitates wireless or wireline communications between the components of the distributed computing system 100 (e.g., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the on-premise computing system 140 and the on-demand computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
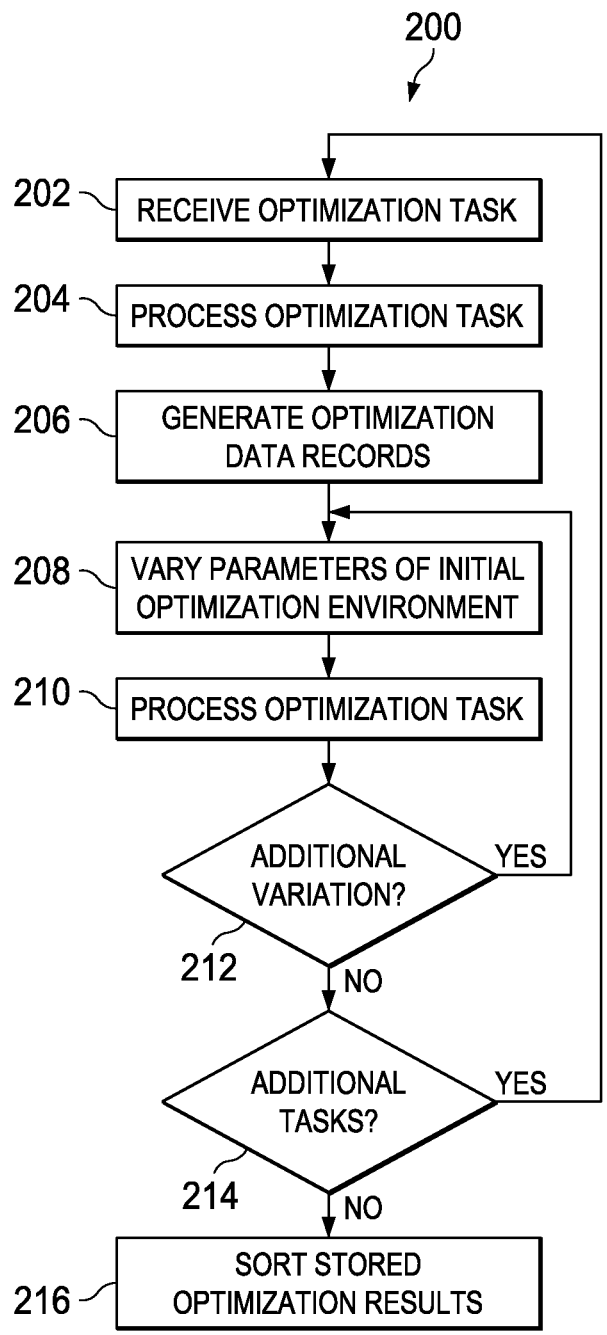
FIG. 2 is a flowchart for optimizing an operating environment of a computing system.

FIG. 2 is a flow chart 200 for optimizing an operating environment of a computing system. For clarity of presentation, the description that follows generally describes method 200 in the context of FIG. 1. However, method 200 may be performed, for example, by any other suitable system, environment, software, and hardware, or a combination of systems, environments, software, and hardware as appropriate.

In step 202, an optimization task is received, from an on-premise computing system, at an on-demand computing system. For example, an optimization task is received from the on-premise computing system 140 at the on-demand computing system 102. The on-premise computing system 140 can send the optimization task through the network 130 such that the on-demand computing system 102 receives the optimization task. For example, the application 146 can send a request to the on-demand computing system 102, and particularly, the optimization engine 118, the request including the optimization task. In some examples, the optimization task is any computational process (or processes) that is performed by a processor (e.g., the processor 144 or 106). In some examples, the optimization task is associated with a problem description (e.g., a set of linear equations, etc.) and associated data.

In some examples, the on-demand computing system 102 can be an enterprise computing system, that is, an authorized computing system directly associated with the application 146. In some examples, the on-demand computing system 102 can be a third party computing system that is authorized by an enterprise computing system for interaction with the application 146. In some examples, the on-demand computing system 102 is a distributed ("cloud") computing system.

In some implementations, the on-demand computing system 102 is remote from the on-premise computing system 140. In some examples, the on-demand computing system 102 can be (physically) inaccessible to by the user of the on-premise computing system 140. In some examples, the on-demand computing system 102 can be geographically remote from the on-premise computing system 140.

In step 204, the optimization task is processed in an initial optimization environment. For example, the optimization task is processed by the processor 106 of the on-demand computing system 102. The processor 106 processes the optimization task in an initial optimization environment. Specifically, the initial optimization environment is an environment (e.g., computing environment) associated with processing of the optimization task. In some examples, the initial optimization environment is associated with the on-premise computing system 140. For example, the initial optimization environment is an environment that the optimization task would be processed in by the processor 144 of the on-premise computing system 140. In some examples, the initial optimization environment is based on one or more of the on-premise computing system 140 (e.g., the computing modules of the on-premise computing system 140), the application 146, and the optimization task. In some examples, the initial optimization environment is associated with one or more processing parameters of the on-premise computing system 140 and/or the optimization task, such as a number of processors (or computing systems), a quantity (and/or speed) of memory storage, and algorithms employed to process the optimization task. In some examples, processing of the optimization task can include processing the data associated with the optimization task (e.g., processing of the linear equations).

Figure 3:
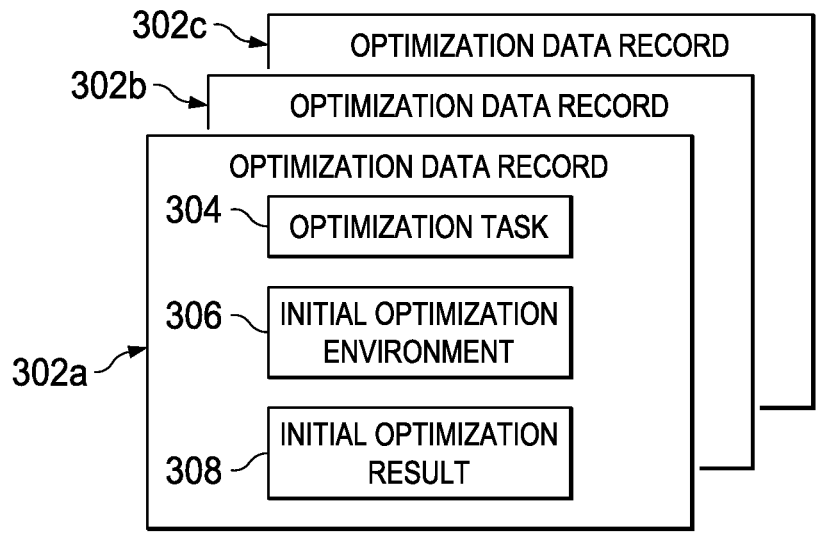
FIG. 3 illustrates an example optimization data record.

In step 206, one or more initial optimization results are computed based on the processing of the optimization task in the initial optimization environment. For example, based on the processor 106 of the on-demand computing system 102 processing the optimization task, one or more initial optimization results are computed based on the initial optimization environment. For each of the initial optimization results, an optimization data record is generated. For example, the on-demand computing system 102, and particularly, the optimization engine 118, generates the optimization data records for each of the initial optimization results. Specifically, as illustrated by FIG. 3, for each initial optimization result, an optimization data record 302 is generated (shown as optimization data records 302a, 302b, 302c). The optimization data record 302 includes the optimization task 304, the initial optimization environment 306, and the initial optimization result 308.

In some implementations, the optimization data record is stored in memory (e.g., in a database). Specifically, the initial optimization results are stored in a repository that is part of or communicably coupled to the on-demand computing system. For example, the on-demand computing system 102 stores the initial optimization results in the memory 107, the repository 128, or a combination thereof. In some examples, the on-demand computing system 102 provides the initial optimization results to the on-premise computing system 140 to store the initial optimization results in memory 148.

In some implementations, a computational cost associated with each of the initial optimization results is determined. For example, the on-demand computing system 102, and particularly, the optimization engine 118, can determine the computational cost associated with each of the initial optimization results, and further, the initial optimization environment. Specifically, the initial optimization environment is associated with a computational cost. In some example, the computational costs relates to parameters associated with the initial optimization environment. For example, the computational costs can relate to the number of processors (or computing systems), the quantity (and/or speed) of memory storage, computational time, and/or the algorithms employed to process the optimization task. In some examples, the computational costs directly correlate to financial costs (e.g., financial costs experience by the user).

In step 208, for each of the optimization data records, one or more parameters of the initial optimization environment is varied to generate an updated optimization environment. For example, the on-demand computing system 102, and particularly, the optimization engine 118, varies parameters of the initial optimization environment. In some implementations, the initial optimization environment is varied for each optimization data record. In some examples, the updated optimization environment of two or more optimization data records can include common varied parameters. In some examples, each of the updated optimization environments of the optimization data records can include differing varied parameters. In some examples, each of the parameters of the initial optimization environment is varied.

In some implementations, varying of the parameters of the initial optimization environment can include varying one or more processing parameters of the on-demand computing system 102, a number of processors 106 (or a number computing systems), a quantity (or speed) of memory storage (e.g., of memory 107), varying one or more algorithms employed by the on-demand computing system 102 to process the optimization task, and/or varying the amount of processing time.

In step 210, for each of the optimization data records, the optimization task is processed in the updated optimization environment to obtain an updated optimization result. For example, the optimization task is processed by the processor 106 of the on-demand computing system 102. The processor 106 processes the optimization task in the updated optimization environment. Specifically, the processor 106 processes the optimization task in the updated optimization environment that is associated with the one or more varied parameters (as compared to the initial optimization environment). Thus, by processing the optimization task in the updated optimization environment by the processor 106, the updated optimization results are obtained (for each optimizations data record). The updated optimization results are based on at least the updated optimization environment. Processing of the optimization task can include processing the data associated with the optimization task (e.g., processing of the linear equations).

In some examples, for one or more of the optimization data records, the updated optimization result differs from the initial optimization result. For example, the updated optimization result differs from the initial optimization result based on the varied parameters of the updated optimization environment as compared to the initial optimization environment. In some examples, for one or more of the optimization data records, the updated optimization result is substantially similar (or the same) as the initial optimization result. For example, the updated optimization result is substantially similar (or the same) as the initial optimization result based on a variance of the parameters of the updated optimization result being insufficient (e.g., insufficient to generate a differing updated optimization result). In some examples, as a result of the updated optimization result being substantially similar (or the same) as the initial optimization result, the one or more parameters of the updated optimization result can be further varied (e.g., varied to a greater degree). In some examples, for one or more of the optimization data records, the updated optimization result is improved (e.g., superior) as compared to the initial optimization result. In some examples, for one or more of the optimization data records, the updated optimization result is worsened (e.g., inferior) as compared to the initial optimization result.

In some implementations, the updated optimization results are stored in a repository that is part of or communicably coupled to the on-demand computing system. For example, the on-demand computing system 102 stores the updated optimization results in the memory 107, the repository 128, or a combination thereof. In some examples, the on-demand computing system 102 provides the updated optimization results to the on-premise computing system 140 to store the updated optimization results in memory 148. In some examples, the updated optimization results are stored separately (e.g., segregated/partitioned) from the initial optimization results.

In some implementations, the computational cost associated with each updated optimization environment is determined. For example, the on-demand computing system 102, and particularly, the optimization engine 118, can determine the computational cost associated with each of the updated optimization results, and further, each of the updated optimization environments. Specifically, each of the updated optimization environments is associated with a computational cost. In some example, the computational costs relates to the variances of the parameters associated with the initial optimization environment. For example, increasing a number of processors (or computing systems), a quantity (or speed) of memory storage, employing additional algorithms to process the optimization task, and/or varying computational time can increase the computational cost of processing the optimization tasks, and thus, increase the computational cost of the updated optimization environment and the updated optimization result. Conversely, a decrease in the computational parameters can decrease the computational cost of processing the optimization task, and thus, decrease the computational cost of the updated optimization environment and the updated optimization result. In some examples, the computational costs directly correlate to financial costs (e.g., financial costs experience by the user).

In step 212, it is determined whether to additionally vary the one or more parameters of the initial optimization environment. For example, the on-demand computing system 102, and particularly, the optimization engine 118, determines whether to additionally vary parameters of the initial optimization environment to generate additional optimization data records. In some implementations, the optimization data records are generated until a statistically relevant number of optimization data records are generated. For example, the optimization engine 118 monitors the optimization data records and determines whether additional generation of optimization data records would significantly produce further optimized optimization results.

In some examples, additional generation of the optimization data records is based on a determined delta between two or more optimization data records. Specifically, when the delta between two or more optimization data records is greater than a delta, additional optimization data records are generated. For example, when the results optimization results between two or more optimization data records is greater than a delta, additional optimization data records are generated.

If it is determined to additionally vary the one or more parameters of the initial optimization environment, the process proceeds to step 208. Specifically, for one or more of the optimization data records, one or more parameters of the initial optimization environment is varied to generate an updated optimization environment. For example, the on-demand computing system 102, and particularly, the optimization engine 118, varies parameters of the initial optimization environment. In some implementations, varying of the parameters of the initial optimization environment can include varying one or more processing parameters of the on-demand computing system 102, a number of processors 106 (or a number computing systems), a quantity (or speed) of memory storage (e.g., of memory 107), varying one or more algorithms employed by the on-demand computing system 102 to process the optimization task, and/or varying computational time of the processors 106 utilizing the algorithms.

If it is determined to not additionally vary the one or more parameters of the initial optimization environment, in step 214, it is determined whether additional optimization tasks are to be received. For example, it is determined whether additional optimization tasks are to be received from the on-premise computing system 140 at the on-demand computing system 102. In some examples, reception of additional optimization can be based on a similarity of previously received optimization tasks. For example, the similarity can be based on a threshold number of optimization tasks and optimizations results that are previously known.

If it is determined that additional optimization tasks are not to be received, in step 216, the stored optimization results are sorted to determine one or more best optimization results of the stored optimization results. The stored optimization results can include any combination of the initial optimization results and the updated optimization results. For example, the on-demand computing system 102 sorts the stored optimization results to determine the best optimization results of the stored optimization results.

In some implementations, one or more of the optimization data records, including the initial optimization results and the updated optimization results, are compared to determine the best optimization results of the stored optimization results. To that end, the on-demand computing system 102, and specifically, the optimization engine 118, can select (e.g., predict) which particular updated optimization result is the best (e.g., optimal) optimization result. Thus, by selecting (e.g., predicting) the best optimization result, a best (e.g., optimal) optimization environment is determined.

In some implementations, a criteria to determine the best (e.g., optimal) optimization result can vary, depending on the specific application of the optimization task. In some examples, the best optimization result can be based on, for each optimization data record, a difference between the updated optimization result and the initial optimization result. Specifically, the optimization engine 118 can determine, across each of the optimization data records, the greatest difference between the initial optimization results and the updated optimization results. Thus, by doing so, the optimization engine 118 identifies the greatest increase in optimization for the optimization task that is based on the updated optimization environment of the best optimization result.

In some examples, the best optimization result can be based on, for each optimization data record, a largest (or smallest) value of the updated optimization result. Specifically, the optimization engine 118 can determine, across each of the optimization data records, the overall largest (or smallest) value of the updated optimization results. Thus, when the criteria is based on an overall maximization or minimization of the optimization task, the optimization engine 118 can identify an appropriate updated optimization result that is based on the updated optimization environment of the best optimization result. In some examples, the best optimization result can be based on a combination of criteria.

In some implementations, the best (e.g., optimal) optimization result can be determined based on one or more boundary conditions. In some examples, the one or more boundary conditions can include computational processing time. Specifically, for a specific criteria, the best optimization results can be determined that can be obtained within a time limit (e.g., as provided by a user). For example, a user provides a time limit such that a best optimization result, based on a criteria, is obtained that was determined within the time limit.

In some implementations, sorting the stored optimization results includes utilizing a simple number comparison. For example, the on-demand computing system 102, and particularly, the optimization engine 118, sorts the stored optimization results (e.g., the initial and the updated optimization results) by comparing the stored optimization results using a simple number comparison. In some examples, the simple number comparison can include comparing each of the stored optimization results to determine a best optimization result based on an overall maximization or minimization of the optimization task. For example, the optimization task can relate to a problem description of a supplier providing a product to factories at different locations. The location of the factories can change on a day-to-day basis due to different customers of the supplier. To that end, the optimization task can relate to minimization of the travel distance each day. To that end, sorting the stored optimization results utilizing a simple number comparison can determine the best optimization result, and thus, the best optimization environment, for the minimization of the travel distance.

In some implementations, sorting the stored optimization results includes utilizing a vector comparison. For example, the on-demand computing system 102, and particularly, the optimization engine 118, sorts the stored optimization results (e.g., the initial and the updated optimization results) by comparing the stored optimization results using a vector comparison. In some examples, one or more of the updated optimization results can include one or more numerical results (e.g., a set of numbers). The updated optimization results that include a set of numbers can be bundled as a vector, and compared to other vectors of the updated optimization results. Comparison of the vectors of the updated optimization results can include determining a Euclidean Distance between the vectors.

In some implementations, sorting the stored optimization results includes utilizing a pattern recognition framework. For example, the on-demand computing system 102, and particularly, the optimization engine 118, sorts the stored optimization results (e.g., the initial and the updated optimization results) by comparing the stored optimization results using a pattern recognition framework. In some examples, the pattern recognition framework includes a neural network. Specifically, when a neural network is employed (e.g., by the optimization engine 118), during the learning cycle of the neural network, the optimization task and the initial optimization environment are inputs to the neural network, and the initial optimization result being the output. During the predictive cycle, the input to the neural network includes the optimization task and the one or more updated optimization environments (e.g., as determined in step 208), and the output of the neural network would include the updated optimization results (e.g., as determined in step 210). Thus, the neural network can determine the best optimization results, and thus, the best optimization environment.

In some implementations, one or more of the best optimization results is prepared for display to a user through the on-premise computing system. For example, the on-demand computing system 102 transmits the best optimization results through the network 130 to the on-premise computing system 140. The on-premise computing system 140 prepares for display the best optimization results on the GUI 142.

In some implementations, the best optimization results can include details regarding the updated optimization environment associated with the best optimization results. In some examples, the details regarding the updated optimization environment can include providing for display the one or more parameters of the initial optimization environment that were varied, and further, the magnitude of variances of the one or more parameters (e.g., the updated parameters of the updated optimization environment).

In some implementations, after preparing for display the best optimization results for display to the user, the user can determine, prior to executing the optimization task, a level of cost and time that is acceptable to the user for the instant optimization task. For example, the customer can determine a financial cost and a quantity of time needed to execute the instant optimization task to obtain the updated (e.g., optimal) optimization results associated with the instant optimization task.

If it is determined that additional optimization tasks are to be received, the process proceeds to step 202. For example, additional optimization tasks are received from the on-premise computing system 140 at the on-demand computing system 102. The on-premise computing system 140 can send the additional optimization tasks through the network 130 such that the on-demand computing system 102 receives the additional optimization tasks.

Figure 4:
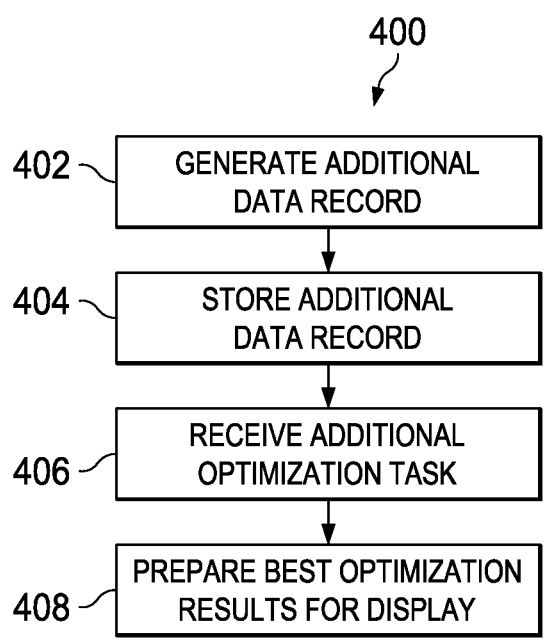
FIG. 4 is a flowchart for optimizing an operating environment of a computing system.

FIG. 4 is a flow chart 400 for optimizing an operating environment of a computing system. For clarity of presentation, the description that follows generally describes method 400 in the context of FIG. 1. However, method 400 may be performed, for example, by any other suitable system, environment, software, and hardware, or a combination of systems, environments, software, and hardware as appropriate.

In step 402, for each of the updated optimization results, an additional data record is generated. For example, the on-demand computing system 102, and particularly, the optimization engine 118, generates the optimization data records for each of the updated optimization results. Specifically, for each updated optimization result, an additional optimization data record is generated. The additional data record includes the optimization task, the updated optimization environment and the updated optimization result.

In step 404, the additional optimization data records are stored in a repository that is part of or communicably coupled to the on-demand computing system. For example, the on-demand computing system 102 stores the updated optimization data records in the memory 107, the repository 128, or a combination thereof. In some examples, the on-demand computing system 102 provides the additional optimization data records to the on-premise computing system 140 to store the additional optimization data records in memory 148.

In step 406, an additional optimization task is received, from the on-premise computing system, at the on-demand computing system. The additional optimization task is substantial the same (or substantially similar) to the previously received optimization task (at step 202). For example, the additional optimization task is received from the on-premise computing system 140 at the on-demand computing system 102. The on-premise computing system 140 can send the additional optimization task through the network 130 such that the on-demand computing system 102 receives the additional optimization task. For example, the application 146 can send a request to the on-demand computing system 102, and particularly, the optimization engine 118, the request including the additional optimization task.

In step 408, in response to receiving the additional optimization task, the one or more best optimization results is prepared for display based on the stored updated optimization data records. For example, the on-demand computing system 102, and particularly, the optimization engine 118, can access the stored updated optimization data records generated based on the previously received optimization task. To that end, when the newly received additional optimization task is similar to the previously received optimization task (e.g., based on a similarity threshold), the optimization engine 118 can access the stored optimization data records to determine the best optimization results for the newly received additional optimization task. Thus, in some examples, the process of method 200, and particularly, varying parameters of the initial optimization environment, and sorting the stored optimization results to determine the best optimization results, is not performed when the additional optimization task is received (as the analysis has previously been performed).

In some examples, the optimization engine 118 compares the newly received additional optimization task with the previously received optimization task to determine whether the similarity is greater than or equal to a similarity threshold. In some examples, the similarity threshold can be based on one or more of the optimization task and the optimization environment associated with each of the newly received additional optimization task and the previously received optimization task.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method of optimizing an operating environment, the method comprising:
   receiving, from a first computing system, an initial optimization task at a second computing system;
   processing the initial optimization task in an initial optimization environment to obtain one or more initial optimization results;
   for each of the one or more initial optimization results, generating an optimization data record that comprises the initial optimization task, the initial optimization environment, and the initial optimization result;
   for each of the optimization data records:
      varying one or more parameters of the initial optimization environment to generate an updated optimization environment;
      processing the initial optimization task in the updated optimization environment to obtain an updated optimization result;
      storing the initial optimization results and updated optimization results in a repository that is part of or communicably coupled to the second computing system; and
      sorting the stored optimization results to determine one or more best optimization results of the stored optimization results;
   receiving, from the first computing system, an additional optimization task at the second computing system;
   comparing the initial optimization task with the additional optimization task to determine a similarity;
   comparing the similarity to a similarity threshold; and
   based on the similarity being greater than the similarity threshold, accessing the optimization data records to identify a particular optimization data record associated with the initial optimization task for display by the first computing system.

2. The method of claim 1, further comprising, for each of the one or more updated optimization results, generating an additional data record that comprises the initial optimization task, the updated optimization environment, and the updated optimization result.

3. The method of claim 2, further comprising storing the additional optimization data records in a repository that is a part of or communicably coupled to the second computing system.

4. The method of claim 1, wherein the initial optimization environment is associated with the first computing system, and processing the initial optimization task comprises processing the initial optimization task by the second computing system that is remote from the first computing system.

5. The method of claim 1, further comprising determining a computational cost associated with each updated optimization environment.

6. The method of claim 1, wherein sorting the stored optimization results further comprises utilizing a simple number comparison, a vector comparison, or utilizing a pattern recognition framework.

7. The method of claim 1, wherein the first computing system is an on-premise computing system and the second computing system is an on-demand computing system.

8. The method of claim 1, further comprising preparing the one or more best optimization results, based on one or more boundary conditions, for display to a user through the first computing system.

9. A non-transitory computer storage medium encoded with a computer program, the program comprising instructions that when executed by one or more computers cause the one or more computers to perform operations comprising:
receiving, from a first computing system, an initial optimization task at a second computing system;
processing the initial optimization task in an initial optimization environment to obtain one or more initial optimization results;
for each of the one or more initial optimization results, generating an optimization data record that comprises the initial optimization task, the initial optimization environment, and the initial optimization result;
for each of the optimization data records:
varying one or more parameters of the initial optimization environment to generate an updated optimization environment;
processing the initial optimization task in the updated optimization environment to obtain an updated optimization result;
storing the initial optimization results and updated optimization results in a repository that is part of or communicably coupled to the second computing system; and
sorting the stored optimization results to determine one or more best optimization results of the stored optimization results;
receiving, from the first computing system, an additional optimization task at the second computing system;
comparing the initial optimization task with the additional optimization task to determine a similarity;
comparing the similarity to a similarity threshold; and
based on the similarity being greater than the similarity threshold, accessing the optimization data records to identify a particular optimization data record associated with the initial optimization task for display by the first computing system.

10. The non-transitory computer storage medium of claim 9, wherein the operations further comprise:
for each of the one or more updated optimization results, generating an additional data record that comprises the initial optimization task, the updated optimization environment, and the updated optimization result.

11. The non-transitory computer storage medium of claim 10, wherein the operations further comprise:
storing the additional optimization data records in a repository that is a part of or communicably coupled to the second computing system.

12. The non-transitory computer storage medium of claim 9, wherein the initial optimization environment is associated with the first computing system, and processing the initial optimization task comprises processing the initial optimization task by the second computing system that is remote from the first computing system.

13. The non-transitory computer storage medium of claim 9, wherein sorting the stored optimization results further comprises utilizing a simple number comparison, a vector comparison, or utilizing a pattern recognition framework.

14. A system of one or more computers configured to perform operations comprising:
receiving, from a first computing system, an initial optimization task at a second computing system;
processing the initial optimization task in an initial optimization environment to obtain one or more initial optimization results;
for each of the one or more initial optimization results, generating an optimization data record that comprises the initial optimization task, the initial optimization environment, and the initial optimization result;
for each of the optimization data records:
varying one or more parameters of the initial optimization environment to generate an updated optimization environment;
processing the initial optimization task in the updated optimization environment to obtain an updated optimization result;
storing the initial optimization results and updated optimization results in a repository that is part of or communicably coupled to the second computing system; and
sorting the stored optimization results to determine one or more best optimization results of the stored optimization results;
receiving, from the first computing system, an additional optimization task at the second computing system;
comparing the initial optimization task with the additional optimization task to determine a similarity;
comparing the similarity to a similarity threshold; and
based on the similarity being greater than the similarity threshold, accessing the optimization data records to identify a particular optimization data record associated with the initial optimization task for display by the first computing system.

15. The system of claim 14, wherein the operations further comprise:
for each of the one or more updated optimization results, generating an additional data record that comprises the initial optimization task, the updated optimization environment, and the updated optimization result.

16. The system of claim 15, wherein the operations further comprise:
storing the additional optimization data records in a repository that is a part of or communicably coupled to the second computing system.

17. The system of claim 14, wherein sorting the stored optimization results further comprises utilizing a simple number comparison, a vector comparison, or utilizing a pattern recognition framework.

* * * * *